US009350218B2

United States Patent
Kubota

(10) Patent No.: US 9,350,218 B2
(45) Date of Patent: May 24, 2016

(54) PRESS-FITTING STRUCTURE

(75) Inventor: Makoto Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 250 days.

(21) Appl. No.: 14/117,583

(22) PCT Filed: Apr. 17, 2012

(86) PCT No.: PCT/JP2012/060329
§ 371 (c)(1),
(2), (4) Date: Nov. 13, 2013

(87) PCT Pub. No.: WO2012/157384
PCT Pub. Date: Nov. 22, 2012

(65) Prior Publication Data
US 2014/0290048 A1    Oct. 2, 2014

(30) Foreign Application Priority Data
May 18, 2011   (JP) .................................. 2011-111788

(51) Int. Cl.
*H02K 15/02*    (2006.01)
*H02K 1/18*    (2006.01)
(Continued)

(52) U.S. Cl.
CPC ................ *H02K 15/02* (2013.01); *B23P 11/00* (2013.01); *H02K 1/18* (2013.01); *H02K 1/187* (2013.01);
(Continued)

(58) Field of Classification Search
CPC . H02K 15/0012; H02K 15/02; H02K 15/024; H02K 1/18; H02K 1/187; H02K 1/28; Y10T 29/49009; Y10T 29/49012; Y10T 29/49075; Y10T 29/49078; Y10T 29/53161; B23P 11/00
See application file for complete search history.

(56) References Cited

U.S. PATENT DOCUMENTS 4,663,835 A * 5/1987 Caillier, Sr. .............. H02K 1/28
5,255,425 A * 10/1993 Kanno ................. H02K 15/024
6,097,115 A   8/2000 Tevaarwerk et al.
2004/0066112 A1* 4/2004 Fauth et al. .............. H02K 1/28

FOREIGN PATENT DOCUMENTS

EP    0291902 A2   11/1988
JP    59-106838 A    6/1984
(Continued)

OTHER PUBLICATIONS

Decision to Grant a Patent dated Feb. 25, 2015, issued in Japanese Patent Application No. 2013-515050. (3 pages).
(Continued)

*Primary Examiner* — A. Dexter Tugbang
(74) *Attorney, Agent, or Firm* — Westerman, Hattori, Daniels & Adrian, LLP

(57) ABSTRACT

A press-fitting structure has a press-fitting face of a rotor yoke formed from a laminated steel sheet is press fitted onto a face to be press-fitted of a rotor shaft, fitting is carried out with plastic deformation while the first projection of a press-fitting face of a rotor yoke, on which a first projection and a first recess extending in substantially the press-fitting direction are formed in turn, and the second projection of the face to be press-fitted of the rotor shaft, on which a second projection and a second recess extending in the direction intersecting the press-fitting direction are formed in turn, are in contact with each other. Since in a state in which press fitting is completed, the amount of plastic deformation of the second projection of the rotor shaft is larger than the amount of plastic deformation of the first projection of the rotor yoke.

4 Claims, 9 Drawing Sheets

(51) Int. Cl.
  *H02K 15/00*  (2006.01)
  *B23P 11/00*  (2006.01)
  *H02K 1/28*  (2006.01)

(52) U.S. Cl.
  CPC .............. *H02K 1/28* (2013.01); *H02K 15/0012* (2013.01); *H02K 15/024* (2013.01); *Y10T 29/49009* (2015.01); *Y10T 29/49012* (2015.01); *Y10T 29/49075* (2015.01); *Y10T 29/49078* (2015.01); *Y10T 29/53161* (2015.01)

(56) References Cited

FOREIGN PATENT DOCUMENTS

| JP | 04-285446 A | 10/1992 |
| JP | 09-093878 A | 4/1997 |
| JP | 10-014147 A | 1/1998 |
| JP | 10-201152 A | 7/1998 |
| JP | 2000-232744 A | 8/2000 |
| JP | 2006-115581 A | 4/2006 |
| JP | 2006-217770 A | 8/2006 |
| JP | 2008-067571 A | 3/2008 |
| JP | 2011-239612 A | 11/2011 |
| JP | 2013021802 A * | 1/2013 |

OTHER PUBLICATIONS

Supplementary European Search Report dated Feb. 11, 2015, issued in corresponding EP Patent Application No. 12786465 (2 pages).
International Search Report for PCT/JP2012/060329, Mailing Date of Jul. 17, 2012.

* cited by examiner

FIG.4
(A)
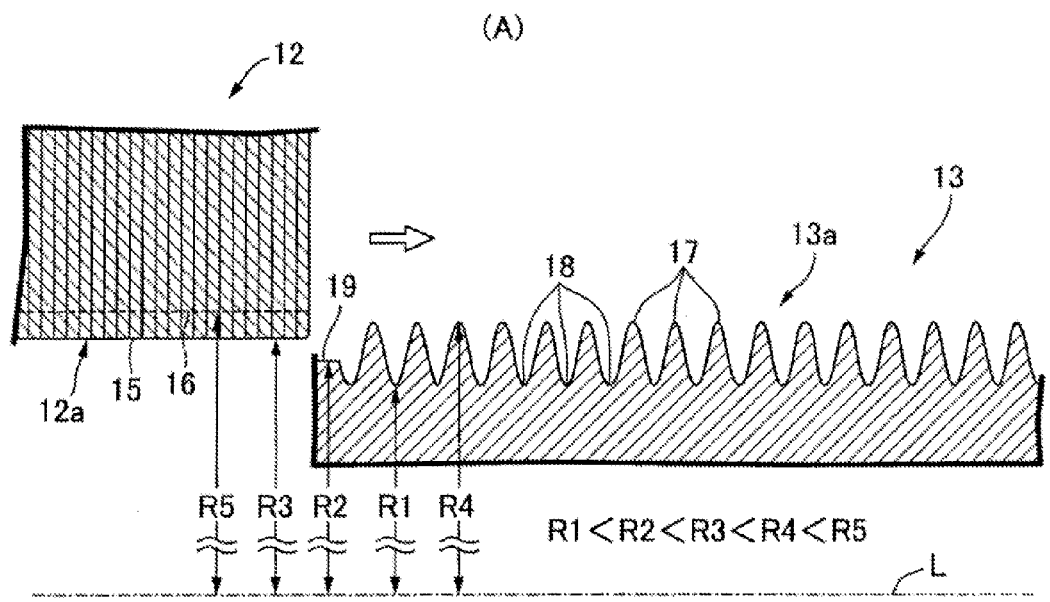
(B)
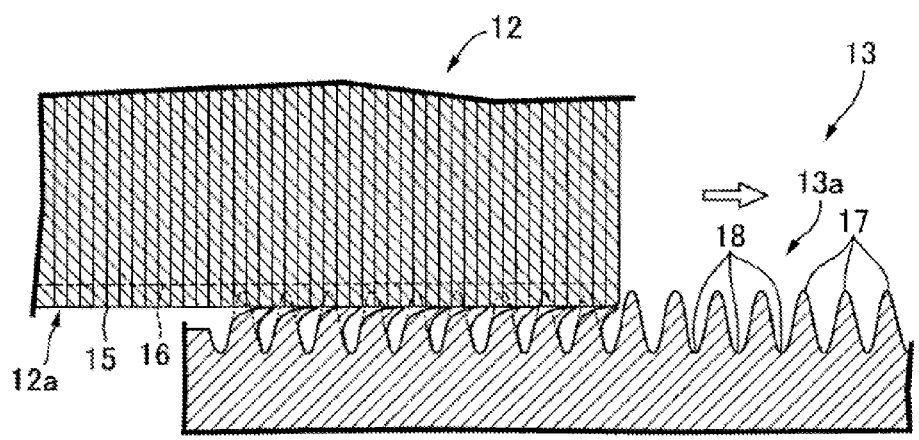

FIG.5
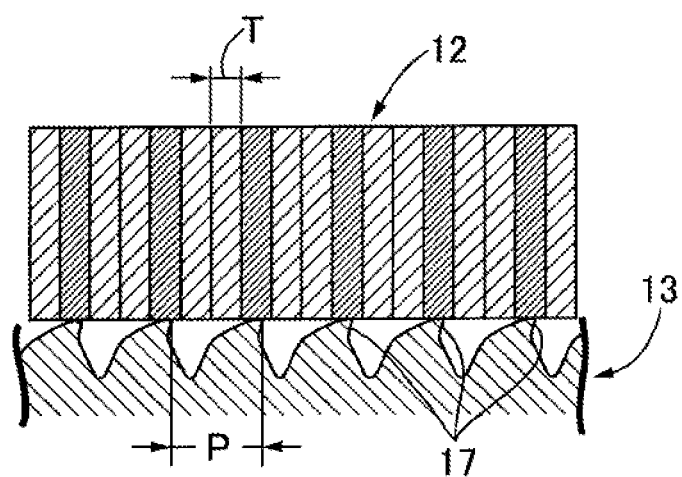
(A)
P>T
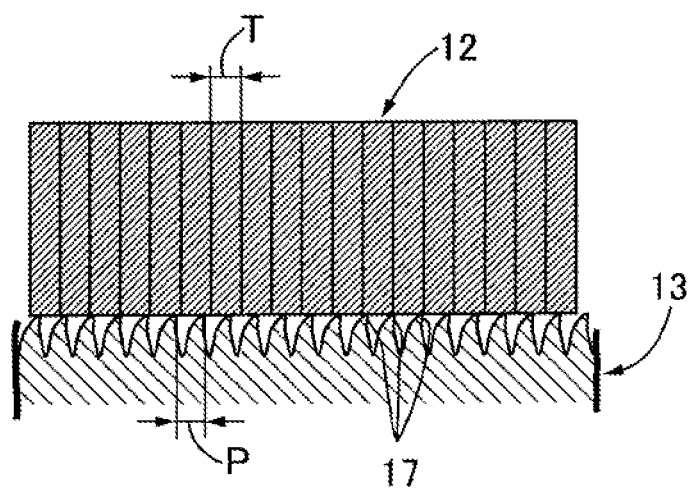
(B)
P≦T

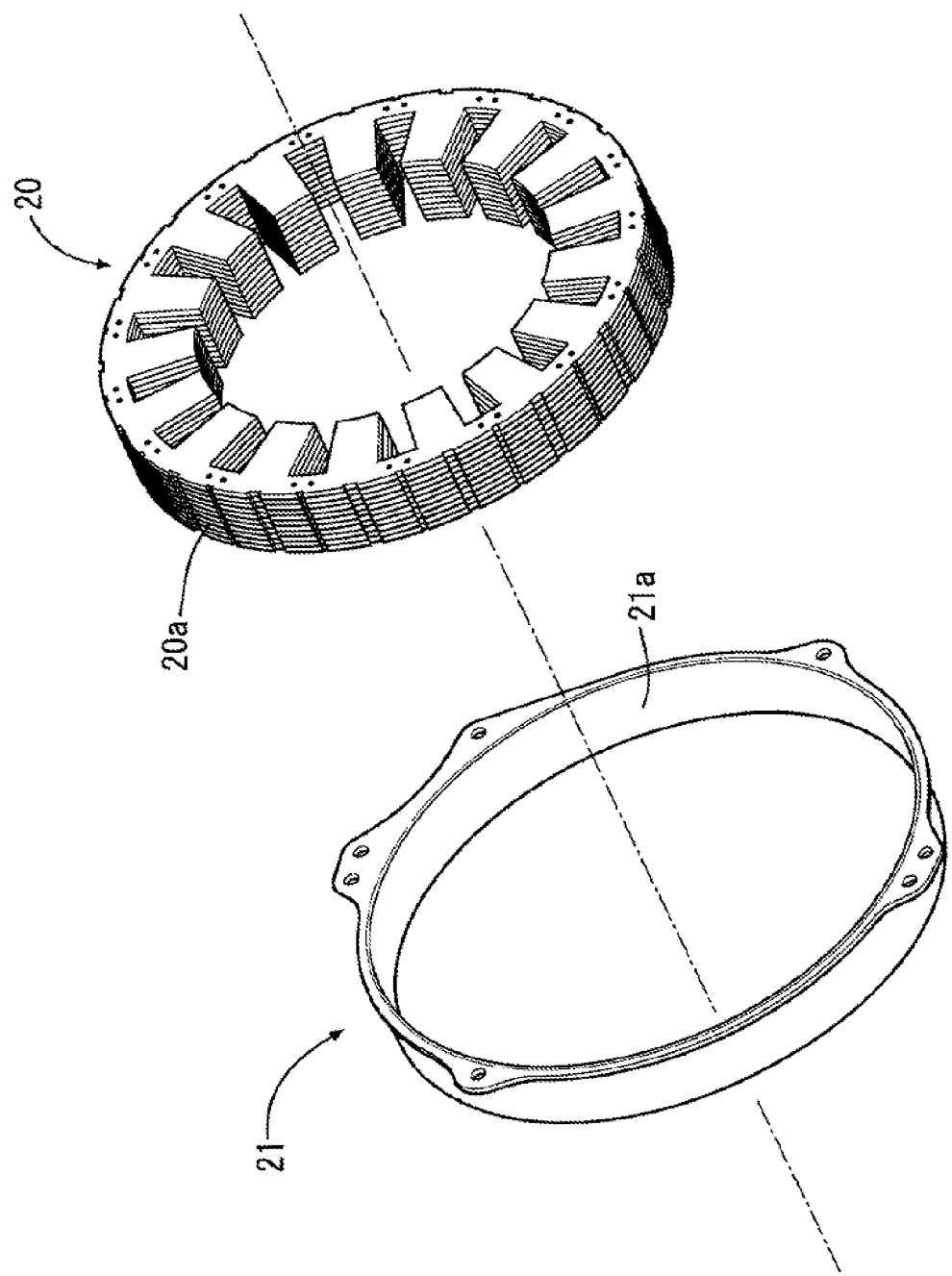

PRESS-FITTING STRUCTURE

TECHNICAL FIELD

The present invention relates to a press-fitting structure for fixing a laminated steel sheet forming a magnetic path to another member by press fitting.

BACKGROUND ART

An arrangement in which a plurality of tightening stress-relieving holes are provided along an outer peripheral part of a stator core formed from a laminated steel sheet, and an outer peripheral face of the stator core is fixed to an inner peripheral face of an annular body shell by means of press fitting or shrink fitting is known from Patent Document 1 below.

Furthermore, an arrangement in which a plurality of recesses are formed in an outer peripheral face of a stator formed from a laminated steel sheet, projections are formed on an inner peripheral face of a motor case into which the stator is press fitted, the projections being fitted into the recesses, and fixing by press fitting is carried out by making the bottom of the recess of the stator and the top face of the projection of the motor case contact each other or making an area other than the recess of the stator and an area other than the projection of the motor case contact each other is known from Patent Document 2 below.

RELATED ART DOCUMENTS

Patent Documents

Patent Document 1: Japanese Patent Application Laid-open No. 2006-115581
Patent Document 2: Japanese Patent Application Laid-open No. 2008-067571

SUMMARY OF INVENTION

Problems to be Solved by the Invention

In the arrangement described in Patent Document 1 above, since substantially all of the outer peripheral face of the stator core is fixed to the inner peripheral face of the body shell by means of press fitting or shrink fitting, there is the problem that it is difficult to sufficiently reduce the residual stress of the stator core merely by forming the stress-relieving, hole. Moreover, since both the outer peripheral face of the stator core and the inner peripheral face of the body shell have a circular cross section, unless a sufficient interference allowance is ensured for the press fitting or shrink fitting, there is a possibility that the stator core and the body shell will rotate relative to each other.

Furthermore, in the arrangement described in Patent Document 2 above, only part of the outer peripheral face of the stator is press fitted to the inner peripheral face of the motor case, but the press-fitting face of the stator extends along the whole length of the press-fitting direction, the area of the press-fitting face is still large, and there is the problem that it is difficult to sufficiently reduce the residual stress of the stator after press fitting.

The present invention has been accomplished in light of the above circumstances, and it is an object thereof, when a laminated steel sheet is fixed to another member by means of press fitting, to reliably carry out fixing while minimizing the stress imposed on the laminated steel sheet and preventing any degradation of magnetic characteristics.

Means for Solving the Problems

In order to attain the above object, according to a first aspect of the present invention, there is provided a press-fitting structure that fixes a laminated steel sheet forming a magnetic path to another member by means of press fitting, wherein a first projection and a first recess are formed in turn on a press-fitting face of the laminated steel sheet, the first projection and the first recess extending in substantially a press-fitting direction, a second projection and a second recess are formed in turn on a face to be press-fitted of the other member, the second projection and the second recess extending in a direction intersecting the press-fitting direction, and in a state in which the first projection and the second projection have been put in contact and press fitted the amount of plastic deformation of the second projection is larger than the amount of plastic deformation of the first projection.

Further, according to a second aspect of the present invention, in addition to the first aspect, the hardness of the laminated steel sheet is higher than the hardness of the other member.

Furthermore, according to a third aspect of the present invention, in addition to the first or second aspect, the pitch of the second projection is larger than the sheet thickness of a single sheet of the laminated steel sheet.

Moreover, according to a fourth aspect of the present invention, in addition to any one of the first to third aspects, the height of the first projection is smaller than the sheet thickness of a single sheet of the laminated steel sheet.

It should be noted here that a rotor yoke 12 of an embodiment corresponds to the laminated steel sheet of the present invention, and a rotor shaft 13 of the embodiment corresponds to the other member of the present invention.

Effects of the Invention

In accordance with the first aspect of the present invention, when the press-fitting face of the laminated steel sheet is press fitted to the face to be press-fitted of the other member, fitting is carried out with plastic deformation while the first projection of the press-fitting face of the laminated steel sheet, on which the first projection and first recess extending in substantially the press-fitting direction are formed in turn, and the second projection of the face to be press-fitted of the other member, on which the second projection and second recess extending in the direction intersecting the press-fitting direction are formed in turn, are in contact with each other. Since in a state in which press fitting is completed, only a section of the laminated steel sheet where the first projection is in contact with the second projection of the other member receives a press-fitting load and, moreover, the amount of plastic deformation of the second projection of the other member is larger than the amount of plastic deformation of the first projection of the laminated steel sheet, by making the second projection be tilted down by the first projection to thus allow the two to mesh with each other, a shear force due to plastic meshing can also be imparted in addition to a frictional force between the press-fitting faces while reducing the residual stress of the laminated steel sheet and minimizing any degradation of the magnetic characteristics, and it is therefore possible to carry out fixing strongly so that relative movement is impossible.

Furthermore, in accordance with the second aspect of the present invention, since the hardness of the laminated steel sheet is higher than the hardness of the other member, it is possible to actively deform the second projection of the other member when press fitting, thus minimizing deformation of the first projection of the laminated steel sheet.

Moreover, in accordance with the third aspect of the present invention, since the pitch of the second projection is larger than the sheet thickness of the single sheet of the laminated steel sheet, among the single sheets of the laminated steel sheet, there occur a single sheet that is in contact with the tip of the second projection and a single sheet that is not in contact with the tip thereof, and since the single sheet that is not in contact with the tip of the second projection does not directly receive a press-fitting load from the other member, it is possible to minimize any degradation of the magnetic characteristics of the single sheet.

Furthermore, in accordance with the fourth aspect of the present invention, since the height of the first projection of the laminated steel sheet is smaller than the sheet thickness of the single sheet of the laminated steel sheet, it is possible to prevent the first projection from being deformed by means of the press-fitting load.

BRIEF DESCRIPTION OF DRAWINGS

FIG. 4 is a diagram for explaining the operation when press fitting. (first embodiment)

FIG. 5 is a diagram showing the relationship between the pitch of a second projection and the sheet thickness of a single sheet of a rotor yoke. (first embodiment)

FIG. 9 is a perspective view of a stator and a stator holder. (second embodiment)

EXPLANATION OF REFERENCE NUMERALS AND SYMBOLS

12 Rotor yoke (laminated steel sheet)
12a Press-fitting face of rotor yoke (laminated steel sheet)
13 Rotor shaft (other member)
13a Face to be press-fitted of rotor shaft (other member)
15 First projection
16 First recess
17 Second projection
18 Second recess

MODES FOR CARRYING OUT THE INVENTION

Modes for carrying out the present invention are explained below by reference to FIG. 1 to FIG. 8.

Figure 1:
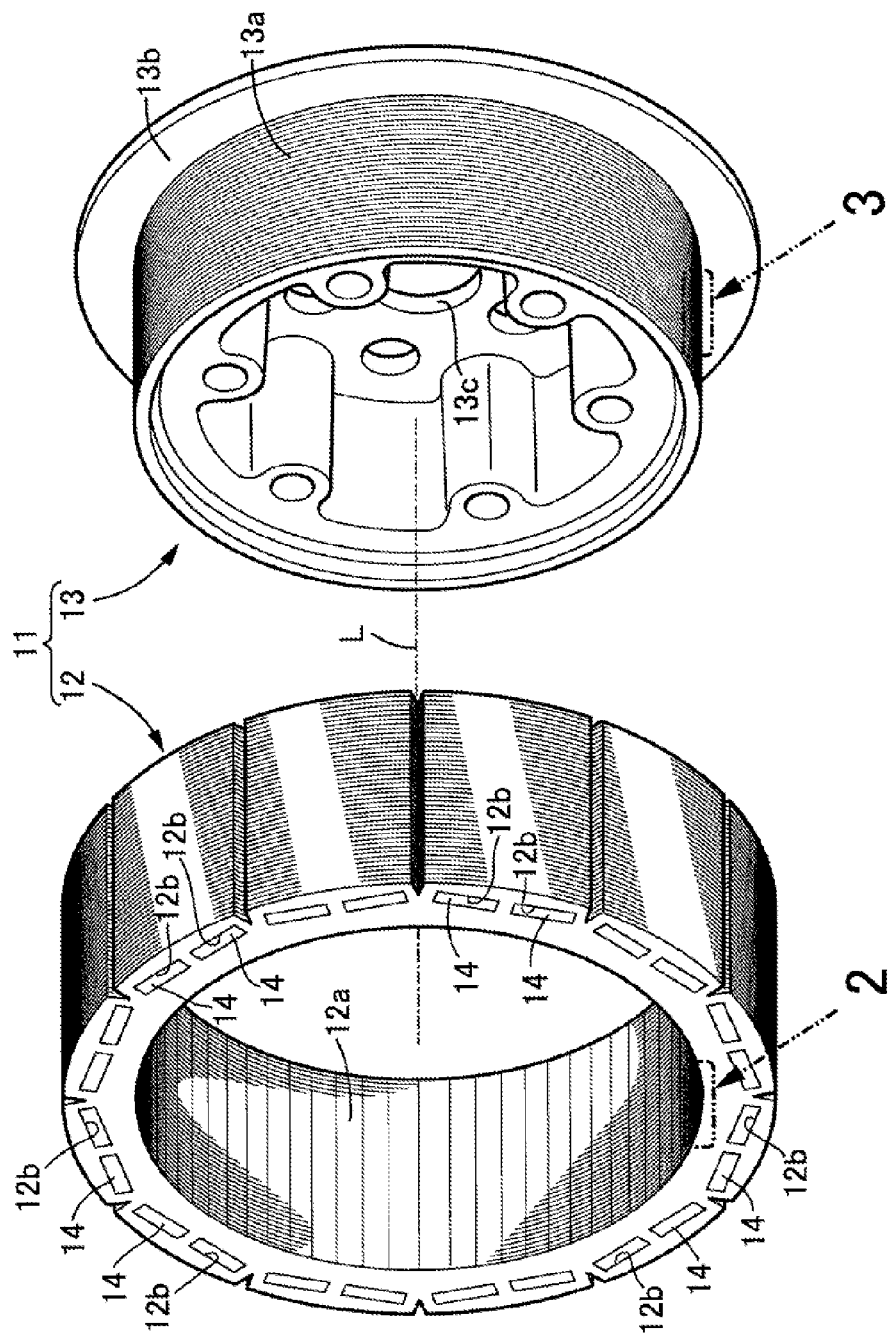
FIG. 1 is an exploded perspective view of a rotor of an electric motor. (first embodiment)

As shown in FIG. 1, a rotor 11 of an electric motor is formed by press fitting a press-fitting face 12a formed on the inner periphery of an annular rotor yoke 12 with an axis L as the center onto a face to be press-fitted 13a formed on the outer periphery of a bottomed cylindrical rotor shaft 13 with the axis L as the center. The rotor yoke 12 is formed from a laminated steel sheet in which a large number of single sheets having the same shape are stacked, the single sheet being formed from an electromagnetic steel sheet, and the rotor shaft 13 is formed from a metal material such that the hardness is lower than that of the rotor yoke 12. Therefore, the hardness of the rotor yoke 12 is higher than the hardness of the rotor shaft 13. The sheet thickness of the single sheet of the electromagnetic steel sheet is for example 0.3 mm. A large number of through holes 12b extend through in the axial direction along an outer peripheral part of the rotor yoke 12, and permanent magnets 14 forming a magnetic pole are support by the through holes 12b. A flange 13b that restricts a press-fitting completion position for the rotor yoke 12 is formed integrally with one side face of the rotor shaft 13, and a shaft hole 13c is formed at the center of the rotor shaft 13, a motor shaft, which is not illustrated, extending through the shaft hole 13c.

Figure 2:
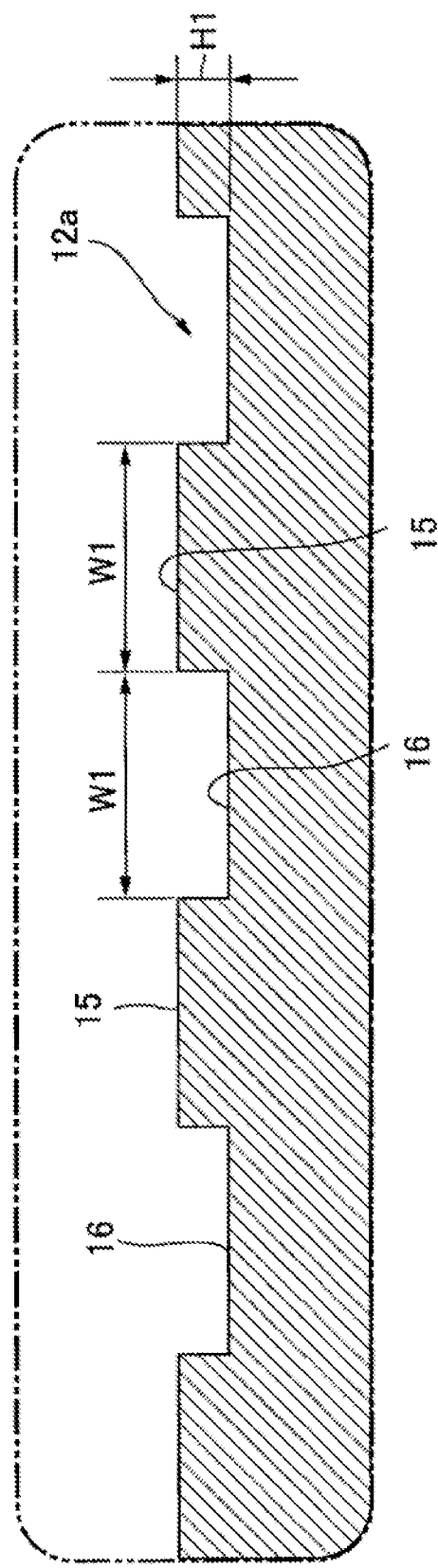
FIG. 2 is an enlarged sectional view of part 2 in FIG. 1. (first embodiment)

As shown in FIG. 2 in an enlarged manner, the press-fitting face 12a formed on the inner periphery of the rotor yoke 12 has a spline-like appearance in which a large number of first projections 15 and a large number of first recesses 16 extending substantially in parallel to the axis L of the rotor 11 are disposed in turn in the circumferential direction. Here, a width W1 in the circumferential direction of the first projection 15 and the second recess 16 is for example 5 mm, whereas a height H1 in the radial direction from a bottom part of the first recess 16 to an apex part of the first projection 15 is for example 75 μm, the ratio of the height H1 to the width W1 being very small. Such first projections 15 and first recesses 16 can be machined by press stamping or wire cutting.

Figure 3:
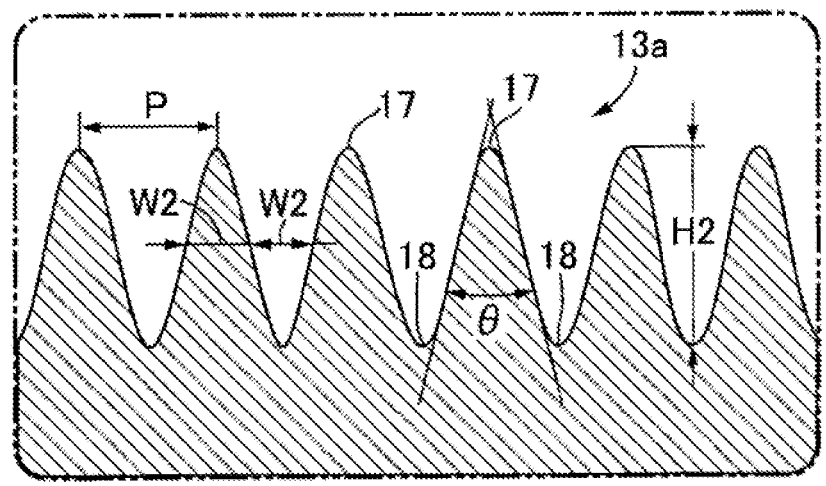
FIG. 3 is an enlarged sectional view of part 3 in FIG. 1. (first embodiment)

As shown in FIG. 3 in an enlarged manner, disposed in turn in the axis L direction on the face to be press-fitted 13a formed on the outer periphery of the rotor shaft 13 are a large number of second projections 17 and second recesses 18 extending in a direction intersecting the axis L, that is, in a substantially circumferential direction. The cross-sectional shape of the second projections 17 and the second recesses 18 is for example a sine wave shape. The second projections 17 or the second recesses 18 are arranged at a pitch P of for example 0.86 mm, a height (depth) H2 of for example 0.75 mm, and a vertical angle θ of for example 60°. A width W2 of the second projection 17 and a width W2 of the second recess 18 are the same and are 0.43 mm, which is half of the pitch P. Such second projections 17 or second recesses 18 can be machined by rolling or cutting.

FIG. 4 shows the relationship in terms of the dimension in the radial direction between the press-fitting face 12a of the rotor yoke 12 and the face to be press-fitted 13a of the rotor shaft 13. When the radius of a bottom part of the second recesses 18 of the rotor shaft 13 is R1, the radius of a normal face 19 (a face on which the second projections 17 or the second recesses 18 are not formed) of the rotor shaft 13 is R2, the radius of an extremity part of the first projections 15 of the rotor yoke 12 is R3, the radius of an extremity part of the second projections 17 of the rotor shaft 13 is R4, and the radius of a bottom part of the first recesses 16 of the rotor yoke 12 is R5, the relationship.

$$R1 < R2 < R3 < R4 < R5$$

is satisfied. Therefore, when press fitting the press-fitting face 12a of the rotor yoke 12 onto the face to be press-fitted 13a of the rotor shaft 13, plastic deformation occurs in a section where the extremity parts of the first projections 15 of the rotor yoke 12, which have the radius R3, and the extremity parts of the second projections 17 of the rotor shaft 13, which have the radius R4, overlap one another, thus achieving press fitting.

Since the rotor yoke 12 and the rotor shaft 13 are formed as described above, when the press-fitting face 12a of the rotor yoke 12 is press fitted in the axis L direction onto the face to be press-fitted 13a of the rotor shaft 13, as shown in FIG. 4 (A), the extremity parts of the first projections 15 of the press-fitting face 12a of the rotor yoke 12 engage with the extremity parts of the second projections 17 of the face to be press-fitted 13a of the rotor shaft 13. In this process, the hardness of the rotor yoke 12 is higher than the hardness of the rotor shaft 13; moreover, the first projections 15 of the rotor yoke 12 extend in parallel to the press-fitting direction and have high tilting stiffness, whereas the second projections 17 of the rotor shaft 13 extend in a direction perpendicular to the press-fitting direction and have low tilting stiffness, and as shown in FIG. 4 (B) the first projections 15 of the rotor yoke 12 undergo hardly any plastic deformation, but the second projections 17 of the rotor shaft 13 undergo plastic deformation to a great extent and are tilted, thus completing the press fitting.

As a result, the face to be press-fitted 13a of the rotor shaft 13 is plastically deformed into a spline shape so as to follow the shape of the spline-like press-fitting face 12a of the rotor yoke 12, and the two are meshed with each other and joined so as to exhibit a large resistance in the rotational direction. Furthermore, the second projections 17 of the rotor shaft 13, which have been tilted down as a 'barb', thus preventing the press-fitting face 12a of the rotor yoke 12 from coming off from the face to be press-fitted 13a of the rotor shaft 13.

When press fitting the press-fitting face 12a of the rotor yoke 12 onto the face to be press-fitted 13a of the rotor shaft 13, since the height H1 (75 μm) of the first projection 15 of the rotor yoke 12 is smaller than the sheet thickness (0.3 mm) of a single sheet of the rotor yoke 12, it is possible to prevent the first projection 15 from being deformed by means of a press-fitting load.

Furthermore since, as shown in FIG. 5 (A), the pitch P (0.86 mm) of the second projections 17 is larger than the sheet thickness T (0.3 mm) of a single sheet of the rotor yoke 12, among the single sheets of the press-fitted rotor yoke 12, there occur single sheets that are in contact with the tip of a second projection 17 and single sheets that are not in contact therewith. Since a single sheet that is not in contact with the tip of a second projection 17 does not directly receive a press-fitting load from the rotor shaft 13, it is possible to minimize any degradation of the magnetic characteristics of the single sheet. As shown in FIG. 5 (B), if the pitch P of the second projections 17 were to be equal to or less than the sheet thickness T of a single sheet of the rotor yoke 12, since all of the single sheets of the press-fitted rotor yoke 12 would be in contact with the tip of a second projection 17 and would directly receive a press-fitting load, the magnetic characteristics would be greatly degraded.

In FIG. 5 (A) and FIG. 5 (B), the single sheets that are in contact with the tip of a second projection 17 are shown with fine hatching so as to have a dark color. Furthermore, since single sheets that are in contact with the tip of a second projection 17 and single sheets that are not in contact therewith are linked to each other by means of swaging, adhesion, etc., single sheets that are not in contact with the tip of a second projection 17 do not undergo displacement.

Figure 6:
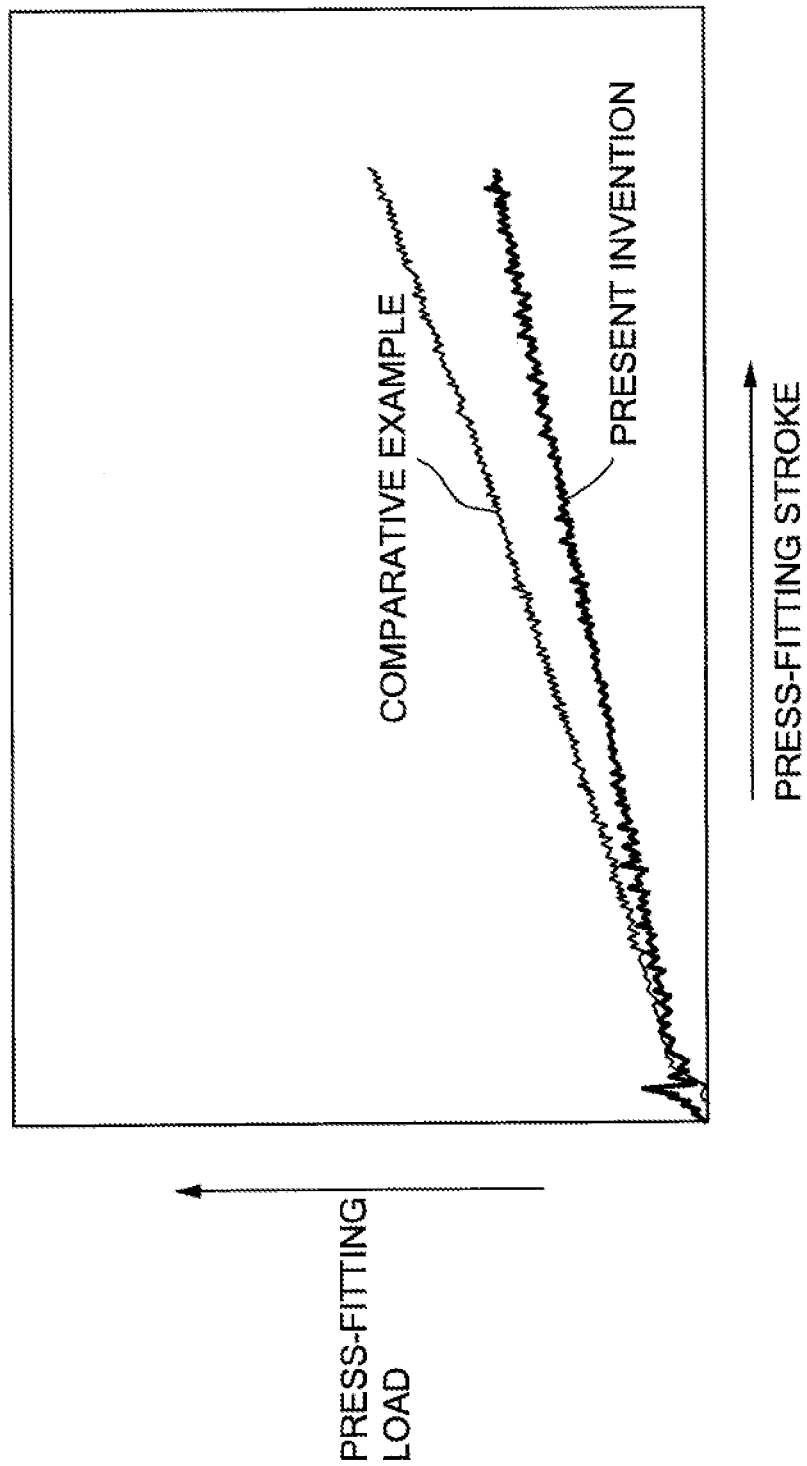
FIG. 6 is a graph showing the relationship between press-fitting load and press-fitting stroke. (first embodiment)

FIG. 6 shows the press-fitting load when the press-fitting face 12a of the rotor yoke 12 is press fitted onto the face to be press-fitted 13a of the rotor shaft 13; the fine solid line denotes a Comparative Example in which both a press-fitting face 12a and a face to be press-fitted 13a are flat, and the bold solid line denotes the embodiment. It can be seen from this figure that the press-fitting load of the embodiment is smaller by about 40% than that of the Comparative Example, and press-fitting work is facilitated.

Figure 7:
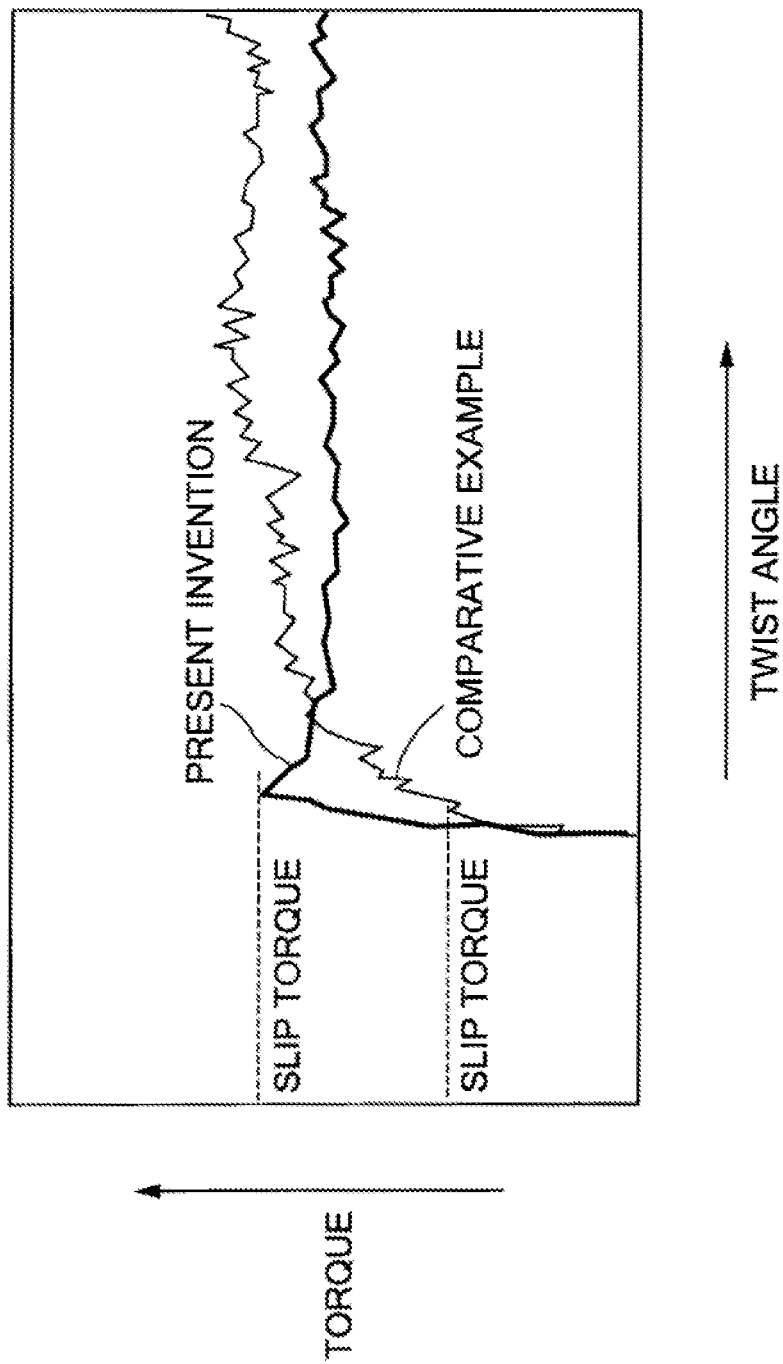
FIG. 7 is a graph showing the relationship between twist angle and torque. (first embodiment)

FIG. 7 shows the torque generated when the press-fitted rotor yoke 12 and rotor shaft 13 are rotated relative to each other; the larger the torque, the stronger the two are joined. In the Comparative Example shown by a fine solid line, when the torque is increased, the two immediately start to slip and rotate relative to each other, but in the embodiment shown by a bold solid line, even when the torque is increased the two exhibit a strong resistance and do not immediately rotate relative to each other, but when the torque attains the maximum torque relative rotation occurs. Therefore, in accordance with the embodiment, the slip torque, at Which the rotor yoke 12 and the rotor shaft 13 start to rotate relative to each other, can be increased.

Figure 8:
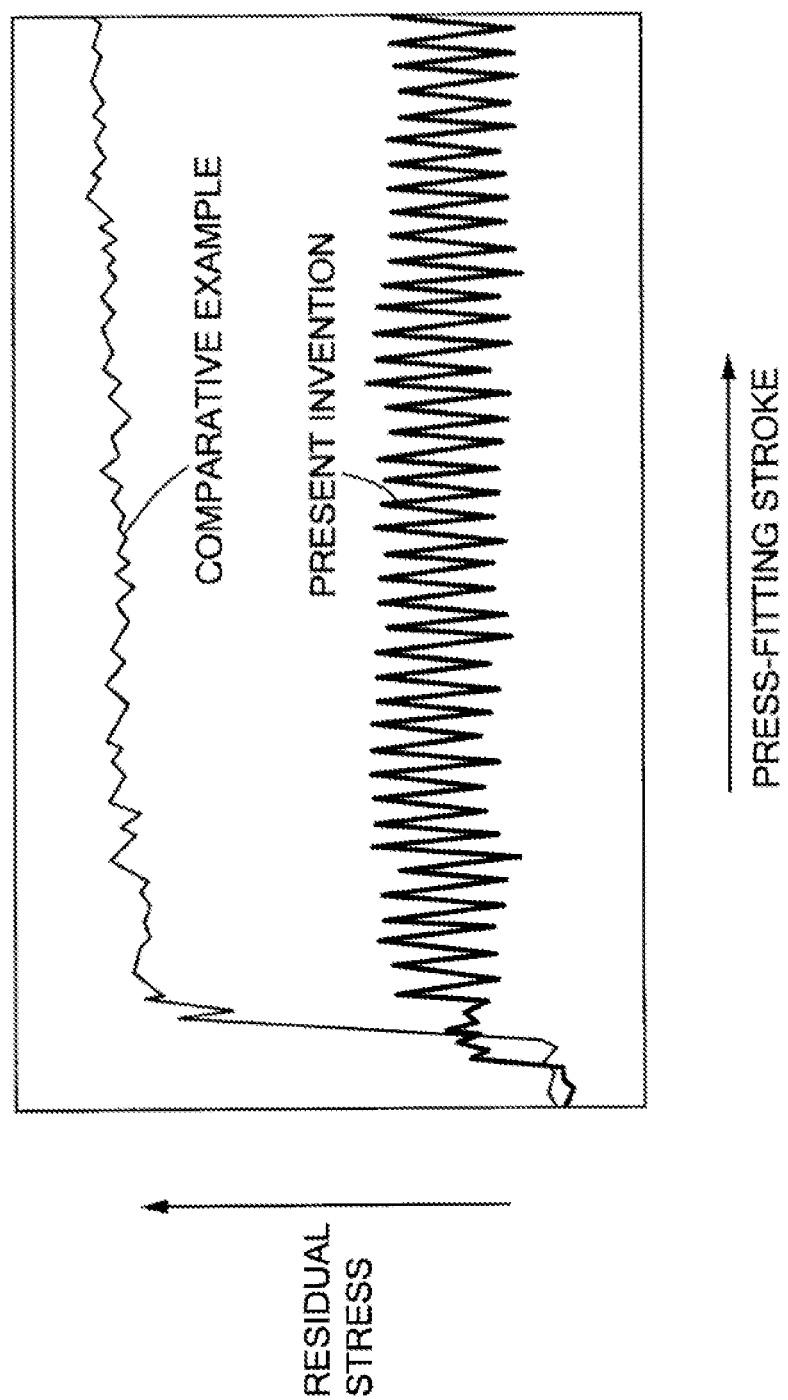
FIG. 8 is a graph showing the relationship between press-fitting stroke and residual stress. (first embodiment)

FIG. 8 shows the residual stress of the rotor yoke 12 with respect to press-fitting stroke, and it can be seen that compared with the Comparative Example shown by a fine solid line, in the embodiment shown by a bold solid line the residual stress is decreased by about 60%. Therefore, employing the press-fitting structure in accordance with the present embodiment enables degradation (increase in core loss) of the magnetic characteristics of the rotor yoke 12 caused by residual stress to be minimized, thus enabling the electric motor to exhibit maximum performance.

In FIG. 6, FIG. 7, and FIG. 8, the press-fitting interference allowance is an identical value for the Comparative Example and the embodiment.

As described above, in accordance with the present embodiment, when the press-fitting face 12a of the rotor yoke 12 is press fitted onto the face to be press-fitted 13a of the rotor shaft 13, by contacting only the extremity parts of the first projections 15 of the rotor yoke 12 and the extremity parts of the second projections 17 of the rotor shaft 13, not only is it possible to decrease the press-fitting load, but it is also possible to reduce the residual stress of the rotor yoke 12 formed from the laminated steel sheet by reducing the contact area at the time of press fitting, thereby minimizing degradation of the magnetic characteristics. Moreover, since the face to be press-fitted 13a of the rotor shaft 13, which has low hardness, undergoes plastic deformation into a spline shape so as to follow the shape of the press-fitting face 12a, of the rotor yoke 12, which has high hardness, it is possible to strongly join the two so that they do not rotate relative to each other.

An embodiment of the present invention is explained above, but the present invention may be modified in a variety of ways as long as the modifications do not depart from the spirit and scope thereof.

For example, the present invention may be applied not only to a rotor of an electric motor but also to a case in which, as in a second embodiment shown in FIG. 9, an outer peripheral face 20a of a stator 20 of an electric, motor is press fitted into an inner peripheral face 21a of a stator holder 21.

Furthermore, the electric motor is not limited to an inner rotor type in which a rotor is disposed on the inner peripheral side of a stator and may be applied to an outer rotor type in which a rotor is disposed on the outer periphery side of a stator, and also may be applied to a generator as well as to an electric motor.

The invention claimed is:

1. A press-fitting structure that fixes a laminated steel sheet forming a magnetic path to another member by means of press fitting, wherein a first projection and a first recess are formed in turn on a press-fitting face of the laminated steel sheet, the first projection and the first recess extending in substantially a press-fitting direction, a second projection and a second recess are formed in turn on a face to be press-fitted of said another member, the second projection and the second recess extending in a direction intersecting the press-fitting direction, in a state in which the first projection and the second projection have been put in contact with each other and press fitted, an amount of plastic deformation of the second projection is larger than an amount of plastic deformation of the first projection, and a pitch of the second projection is larger than a sheet thickness of a single sheet of the laminated steel sheet.

2. The press-fitting structure according to claim 1, wherein a hardness of the laminated steel sheet is higher than a hardness of said another member.

3. The press-fitting structure according to claim 2, wherein a height of the first projection is smaller than the sheet thickness of a single sheet of the laminated steel sheet.

4. The press-fitting structure according to claim 1, wherein a height of the first projection is smaller than the sheet thickness of a single sheet of the laminated steel sheet.

* * * * *